(12) United States Patent
Koyama (10) Patent No.: US 7,624,201 B2
(45) Date of Patent: Nov. 24, 2009

(54) DATA OUTPUT APPARATUS THAT LOCKS AND UNLOCKS DATA FORMAT

(75) Inventor: Shinichi Koyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 130 days.

(21) Appl. No.: 11/060,304

(22) Filed: Feb. 18, 2005

(65) Prior Publication Data

US 2005/0188115 A1    Aug. 25, 2005

(30) Foreign Application Priority Data

Feb. 23, 2004    (JP) .............................. 2004-047053

(51) Int. Cl.
G06F 3/00    (2006.01)
H04N 7/20    (2006.01)

(52) U.S. Cl. ........................................... 710/5; 725/80

(58) Field of Classification Search ..................... 710/5; 725/80
See application file for complete search history.

(56) References Cited

U.S. PATENT DOCUMENTS

| 5,262,860 | A | * | 11/1993 | Fitzpatrick et al. | .......... 348/461 |
| 5,448,306 | A | | 9/1995 | Koyama | ...................... 348/678 |
| 5,774,192 | A | | 6/1998 | Koyama | ...................... 348/715 |
| 5,845,147 | A | * | 12/1998 | Vishlitzky et al. | ............... 710/5 |
| 6,747,590 | B1 | * | 6/2004 | Weber | ......................... 341/176 |
| 7,032,059 | B1 | | 4/2006 | Yamada et al. | .............. 710/313 |
| 7,145,872 | B1 | | 12/2006 | Kim | ............................. 370/230 |
| 2001/0002846 | A1 | * | 6/2001 | Onishi | ......................... 348/231 |
| 2001/0018768 | A1 | * | 8/2001 | Horiguchi et al. | .............. 725/80 |
| 2002/0102095 | A1 | | 8/2002 | Koyama | ...................... 386/96 |
| 2003/0202216 | A1 | | 10/2003 | Nakama et al. | ............. 358/302 |

FOREIGN PATENT DOCUMENTS

| CN | 1274230 A | 11/2000 |
| EP | 1 052 574 A2 | 11/2000 |

(Continued)

OTHER PUBLICATIONS

Samuel Reynolds, 'Working with Threads—Semaphores—Traffic Control for Threads', Nov. 17, 1998, ScriptMeridian.*

(Continued)

*Primary Examiner*—Henry W. H. Tsai
*Assistant Examiner*—Hyun Nam
(74) *Attorney, Agent, or Firm*—Fitzpatrick, Cella, Harper & Scinto (57) ABSTRACT

A data output apparatus (a) sets an output terminal to a first state where a data format of the output terminal is locked to a data format indicated by a first command and where the output terminal cannot output video data whose data format is different from the data format indicated by the first command, if the first command is received from a first control device, and (b) sets the output terminal to a second state where the data format of the output terminal is not locked to the data format indicated by the first command and where the output terminal can output video data whose data format is different from the data format indicated by the first command, if the second command is received from a second control device while the data format of the output terminal is locked to the data format indicated by the first command.

4 Claims, 4 Drawing Sheets

FOREIGN PATENT DOCUMENTS

| | | |
|---|---|---|
| JP | 2001-094583 | 4/2001 |
| JP | 2001-275076 | 10/2001 |
| JP | 2003-242053 | 8/2003 |

OTHER PUBLICATIONS

IEC 61883-1, Consumer audio/video equipment—Digital Interface—Part 1 General, First edition, Feb. 1998, pp. 1-83.

Universal Serial Bus Specification Revision 2.0, Apr. 27, 2000, pp. i-622 (in two parts).

TA Document 2001012, AV/C Digital Interface Command Set General Specification Version 4.1, 1394 Trade Association, Dec. 11, 2001, pp. 1-108.

Aug. 20, 2007 European Search Report in European Patent Application No. 05 25 1020.

Jul. 20, 2007 Chinese Official Action in Chinese Patent Application No. 200510008194.1 (with translation).

IEEE Std 1394-1995, IEEE Standard for a High Performance Serial Bus, The Institute of Electrical and Electronics Engineers, Inc., 1996, pp. i-45.

IEEE Std 1394a-2000, IEEE Standard for a High Performance Serial Bus-Amendment 1, The Institute of Electrical and Electronics Engineers, Inc., 2000, pp. i-23.

IEC 61883-2: Consumer audio/video equipment-Digital interface-Part 2: SD-DVCR data transmission, First Edition, Feb. 1998, pp. 1-17.

IEC 61883-4: Consumer audio/video equipment-Digital interface-Part 4: MPEG2-TS data transmission, First Edition, Feb. 1998, pp. 1-23.

* cited by examiner

| | MSB | | | | | | LSB |
|---|---|---|---|---|---|---|---|
| OPCODE | \multicolumn{7}{l|}{OUTPUT PLUG SIGNAL FORMAT LOCK} |
| OPERAND[0] | \multicolumn{7}{l|}{LOCK} |
| OPERAND[1] | FORMAT | \multicolumn{6}{l|}{PLUG NUMBER} |

FIG. 5

| | MSB | | | | | | LSB |
|---|---|---|---|---|---|---|---|
| OPCODE | \multicolumn{7}{l|}{INPUT PLUG SIGNAL FORMAT LOCK} |
| OPERAND[0] | \multicolumn{7}{l|}{LOCK} |
| OPERAND[1] | FORMAT | \multicolumn{6}{l|}{PLUG NUMBER} |

DATA OUTPUT APPARATUS THAT LOCKS AND UNLOCKS DATA FORMAT

BACKGROUND OF THE INVENTION

1. Field of the Invention

The present invention relates to a data output apparatus having output means of outputting a plurality of types of data, a data input apparatus having input means of inputting a plurality of types of data, and the like.

2. Related Background Art

Currently, there has been proposed a recording and reproducing apparatus having a function of recording a plurality of types of stream data on a magnetic tape and a function of reproducing a plurality of types of stream data from a magnetic tape (for example, Document 1 described below). In the Document 1, there has been proposed a recording and reproducing apparatus, which records a SD (Standard Definition) video data or a HD (High Definition) video data on a magnetic tape. Here, the SD video data is a vide data which conforms to a DV system formulated by a HD Digital VCR Conference, and the HD video data is video data conformed to a MPEG-2 system.

Also currently, in the network interface of the recording and reproducing apparatus, there have been known IEEE 1394 standards (see Documents 2 and 3), and USB standard (see Document 4). Either of the IEEE 1394 standards and the USB standard is a standard regarding a high-speed serial bus. In particular, in the network interface (hereinafter referred to as IEEE 1394 interface) conformed to the IEEE 1394 standards, it is possible to control input and output of the stream data conformed to the DV system or the MPEG-2 system (see Document 5 to 7). Hereinafter, the stream data (including audio and video data) conformed to the DV system is referred to as "DV data", and the stream data (including audio and video data) conformed to the MPEG-2 system is referred to as "MPEG-2 data".

Respective documents referred to as described above are as follows.

Document 1: Japanese Patent Application Laid-Open No. 2001-275076

Document 2: IEEE Std 1394-1995, IEEE Standard for a High Performance Serial Bus, Institute of Electrical and Electronics Engineers, Inc.

Document 3: IEEE Std 1394a-2000, IEEE Standard for a High Performance Serial Bus—Amendment 1, Institute of Electrical and Electronics Engineers, Inc.

Document 4: Universal Serial Bus Specification Revision 2.0, Apr. 27, 2000

Document 5: IEC 61883-1: Consumer audio/video equipment—Digital interface—Part 1: General Document 6: IEC 61883-2: Consumer audio/video equipment—Digital interface—Part 2: SD-DVCR data transmission Document 7: IEC 61883-4: Consumer audio/video equipment—Digital interface—Part 4: MPEG2-TS data transmission In the case of a recording and reproducing apparatus having an IEEE 1394 interface and conforming to the IEC 61883-1, IEC 61883-2 and IEC 61883-4, it is possible to continuously output DV data and MPEG-2 data to the outside through an oPCR defined by the IEC 61883-1, and also continuously receive DV data and MPEG-2 data from the outside through an iPCR defined by the IEC 61883-1.

Depending on a control apparatus for remote-controlling the above described recording and reproducing apparatus, there are some cases where it would be better to lock a data format of the stream data outputted from the oPCR of the recording and reproducing apparatus to a predetermined data format. For example, when the control apparatus can process the DV data, but cannot process the MPEG-2 data, a data format of the stream data outputted from the oPCR would be better to be locked to the DV system.

However, at present, there has been no command clearly defined, which requests to change an oPCR state to a locked state (a state locked to a predetermined data format (either of the DV system, the MPEG-2 system, and the like)). There has been also no command clearly defined, which requests to change the oPCR state to an unlocked state (state in which a locked state is released). Consequently, from the control apparatus, the oPCR state cannot be changed into the locked state or the unlocked state. Further, in case there exist a plurality of control apparatuses, it is also not clearly defined as to which command from the control apparatuses should be given a priority. These problems also hold true for the command which requests that the data format of the stream data inputted to the iPCR is locked to a predetermined data format.

Further, these problems are also problems occurable also in the recording and reproducing apparatus having output means (including not only a logical output terminal such as the oPCR, but also a physical output terminal) which is equivalent to the oPCR defined by the IEC 61883-1, and still also problems occurable in the recording and reproducing apparatus having input means (including not only a logical input terminal such as the iPCR, but also a physical input terminal) which is equivalent to the iPCR defined by the IEC 61883-1.

SUMMARY OF THE INVENTION

An object of the present invention is to overcome the above-described drawbacks.

Further, an object of the present invention is, for example, to be able to change a state of the output means (for example, the oPCR defined by the IEC 61883-1) or the input means (for example, the iPCR defined by the IEC 61883-1) to a locked state (state locked to a predetermined data format) or an unlocked state (state in which a locked stated is released) according to commands from a control apparatus.

Further, an object of the present invention is, for example, to be able to set a state of the output means according to the command even in case the command requesting to change, for example, a state of output means (the oPCR defined by the IEC 61883-1) to a locked state or an unlocked state is transmitted from a plurality of control apparatuses.

Further, an object of the present invention is, for example, to be able to set a state of input means according to the command even in case the command requesting to change, for example, a state of the input means (the iPCR defined by the IEC 61883-1) to a locked state or an unlocked state is transmitted from a plurality of control apparatuses.

According to an aspect of the present invention, a data output apparatus of the present invention comprises: receiving unit, adapted to receive a command which requests that a state of output means is set to a state locked to a data format; and a setting unit, adapted to set a state of the output means to a state locked to the predetermined data format, according to the command regardless of the state of the output means.

According to another aspect of the present invention, a data output apparatus of the present invention comprises: a receiving unit, adapted to receive a command which requests that a state of output means is set to a state not locked to a predetermined data format; and a setting unit, adapted to set a state of the output means to a state not locked to the predetermined data format, according to the command regardless of the state of the output means.

According to still another aspect of the present invention, a data input apparatus of the present invention comprises: a receiving unit, adapted to receive a command which requests that a state of input means is set to a state locked to a predetermined data format; and a setting unit, adapted to set the state of the input means to a state locked to the predetermined data format, according to the command regardless of the state of the input means.

According to still another aspect of the present invention, a data input apparatus of the present invention comprises: a receiving unit, adapted to receive a command which requests that a state of input means is set to a state not locked to a predetermined data format; and a setting unit, adapted to set the state of the input means to a state not locked to the predetermined data format, in accordance with the command regardless of the state of the input means.

Other features and advantages of the invention will be apparent from the following description take in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DESCRIPTION OF THE PREFERRED EMBODIMENTS

Embodiments of the invention will be described in detail below with reference to the drawings.

Hereinafter, preferable embodiments of the present invention will be described with reference to the drawings.

First Embodiment

First, main components of a control system according to a first embodiment will be described with reference to FIG. 1.

Figure 1:
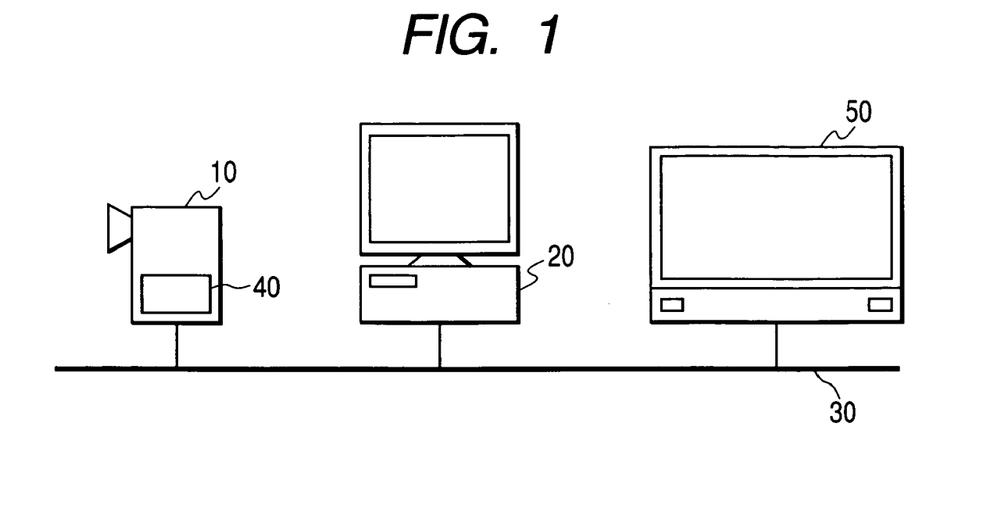
FIG. 1 is a view to explain main components of a control system according to a preferable embodiment of the present invention.

In FIG. 1, reference numeral 10 denotes a recording and reproducing apparatus, which has a function to receive a plurality of types of stream data from the outside and record them on a recording medium, and a function to reproduce a plurality of types of stream data from the recording medium and output them to the outside. In the present embodiment, a case will be described, where the recording and reproducing apparatus 10 is an apparatus to handle the above described DV data and MPEG-2 data. Further, in the present embodiment, a case will be also described, where the DV data includes SD (Standard Definition) video data, and the MPEG-2 data includes HD (High Definition) video data having a higher resolution (the number of pixels) than the SD video data. Further, in the present embodiment, though a case will be described, where the recording and reproducing apparatus 10 is a digital video camera (hereinafter referred to as DVC), the recording and reproducing apparatus 10 may be an apparatus otherwise, such as a digital camera, a mobile phone with camera, a digital video recorder, and the like.

Reference numeral 20 denotes a first control apparatus having a program of remote-controlling the recording and reproducing apparatus 10. In particular, the first control apparatus 20 has a program, which controls a state of the output terminal (oPCR defined by the IEC 61883-1) and the input terminal (iPCR defined by the IEC 61883-1) of the DVC 10 by using an OUTPUT PLUG SIGNAL FORMAT LOCK command and an INPUT PLUG SIGNAL FORMAT LOCK command to be described later. In the present embodiment, a case will be described, where the first control apparatus 20 is a personal computer (hereinafter referred to as PC).

Reference numeral 50 denotes a second control apparatus having a program of remote-controlling the recording and reproducing apparatus 10. The second control apparatus 50 also, similarly to the first control apparatus 20, has a program, which controls a state of the output terminal (oPCR defined by the IEC 61883-1) and the input terminal (iPCR defined by the IEC 61883-1) of the DVC 10 by using the OUTPUT PLUG SIGNAL FORMAT LOCK command and the INPUT PLUG SIGNAL FORMAT LOCK command to be described later. In the present embodiment, a case will be described, where the second control apparatus 50 is a display device (hereinafter, referred to as DTV) with a digital television tuner.

Reference numeral 30 is a transmission medium, which connects the DVC 10, the PC 20, and the DTV 50. In the present embodiment, a case will be described, where the transmission medium 30 is an IEEE 1394 serial bus. The IEEE 1394 serial bus is a serial bus conformed to the above described IEEE 1394 standards.

Reference numeral 40 is a recording medium attachable to the DVC 10. In the present embodiment, though a case will be described, where the recording medium 40 is a magnetic tape, the recording medium 40 may be a recording medium otherwise, for example, such as a hard disk device, an optical disk, a magnetic disk, and the like.

Each of the DVC 10, the PC 20 and the DTV 50 has the above described IEEE 1394 interface, and can perform a communication with each other through the IEEE 1394 serial bus 30.

Next, the main components of the DVC 10 will be described with reference to FIG. 2.

Figure 2:
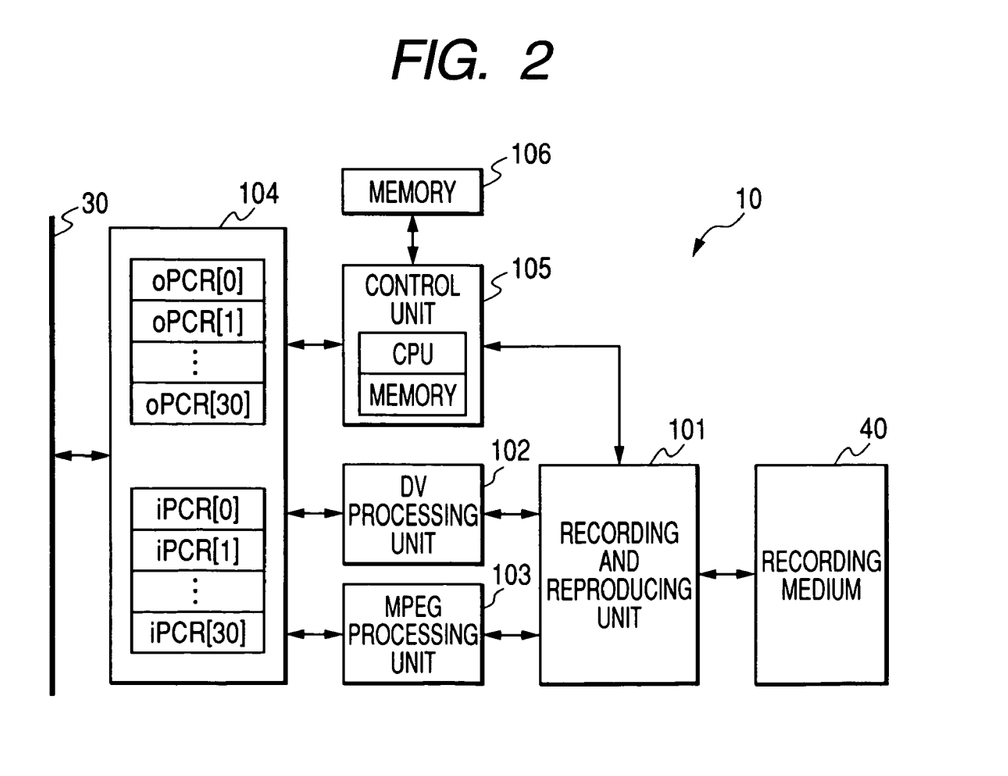
FIG. 2 is a block diagram to explain main components of a recording and reproducing apparatus (for example, DVC) according to the preferable embodiment of the present invention.

In FIG. 2, reference numeral 101 denotes a recording and reproducing unit, which has a function to reproduce the stream data (DV data or MPEG-2 data) recorded on the recording medium 40, and a function to record the inputted stream data (DV data or MPEG-2 data) on the recording medium 40. Reference numeral 102 denotes a DV processing unit of processing the DV data. Reference numeral 103 denotes an MPEG processing unit of processing the MPEG-2 data. Reference numeral 104 denotes an IEEE 1394 interface unit, which can communicate with the PC 20 and the DTV 50. The IEEE 1394 interface unit 104 has 31 oPCRs (output plug control resister) and 31 iPCRs (input plug control resister). The oPCR is a logical output terminal defined by the IEC 61883-1, and the iPCR is a logical input terminal defined by the IEC 61883-1. Reference numeral 105 denotes a control unit, which has a CPU (Central Processing Unit) and a memory storing a program (including a program to control the process to be described in FIGS. 6 and 7) to be executed by the CPU.

Reference numeral 106 denotes a memory, which stores information regarding states of all the oPCRs and iPCRs. Hereinafter, the information regarding a state of the oPCR will be referred to as "oPCR information", and the information regarding a state of the iPCR will be referred to as "iPCR information". Each piece of oPCR information includes a value showing whether or not the oPCR is in a locked state and a value showing a current format. Each piece of iPCR information includes whether or not the iPCR is in a locked state and a value showing a current format. This current format is a data format currently selected by the control unit 105. For example, in case a power source is turned on, the control unit 105 sets the current formats of all the oPCRs and iPCRs into the DV system. Further, in case the MPEG-2 data are reproduced from the recording medium 40 when the current format is the DV system, the control unit 105 changes the current format of the oPCR and the iPCR in an unlocked state into the MPEG-2 system. Further, in case the DV data are reproduced from the recording medium 40 when the current format is the MPEG-2 system, the control unit 105 changes the current format of the oPCR and the iPCR in an unlocked state into the DV system. The initial value of the current format can be also changed by the user.

In case the DV data reproduced from the recording medium 40 is transmitted to the PC 20 or the DTV 50, the DVC 10 transmits the DV data to the PC 20 or the DTV 50 through the DV processing unit 102 and at least one oPCR. Further, in case the MPEG-2 data reproduced from the recording medium 40 is transmitted to the PC 20 or the DTV 50, the DVC 10 transmits the MPEG-2 data to the PC 20 or the DTV 50 through the MPEG processing unit 103 and at least one oPCR.

In case the DV data transmitted from the PC 20 or the DTV 50 is recorded on the recording medium 40, the DVC 10 records the DV data on the recording medium 40 through at least one iPCR, and the DV processing unit 102. Further, in case the MPEG-2 data transmitted from the PC 20 or the DTV 50 is recorded on the recording medium 40, the DVC 10 records the MPEG-2 data on the recording medium 40 through at least one iPCR and the MPEG processing unit 103.

Figure 3:
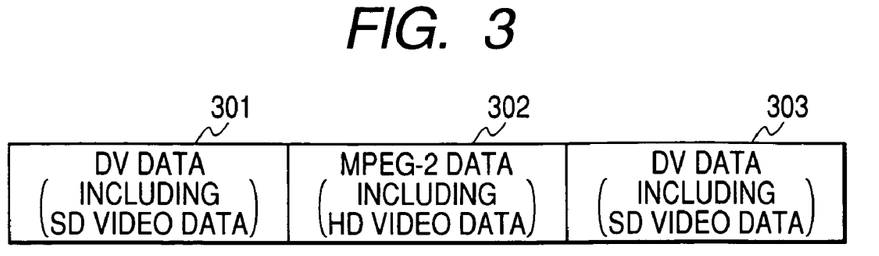
FIG. 3 is a view to show one example of a plurality of stream data recorded on a recording medium (for example, a magnetic tape)

Next, FIG. 3 explains one example of a plurality of stream data recorded on the recording medium 40. On the recording medium 40, as shown in FIG. 3, the stream data conformed to a plurality of data formats are recorded.

In FIG. 3, reference numerals 301 and 303, similarly to the DV data, denote the stream data (including audio and video data) conformed to the DV system. Reference numeral 302, similarly to the MPEG-2 data, denotes the stream data (including audio and video data) conformed to the MPEG-2 system. In the present embodiment, the DV data shall include the SD (Standard Definition) video data, and the MPEG-2 data shall include the HD (High definition) video data having a higher resolution (more pixels) than the SD video data.

Next, the constitutions of an OUTPUT PLUG SIGNAL FORMAT LOCK command and an INPUT PLUG SIGNAL FORMAT LOCK command used in the present embodiment will be described by using FIGS. 4 and 5.

In the present embodiment, a state in which one oPCR or iPCR is locked into at least one data format is referred to as "locked state", and a state in which one oPCR or iPCR is released from the locked state (in other words, a state not locked to either data format) is referred to as "unlocked state". Further, a state in which one oPCR or iPCR is locked into the DV system is referred to as "DV locked state", and a state in which one oPCR or iPCR is locked to the MPEG-2 system is referred to as "MPEG locked state". Further, an OUTPUT PLUG SIGNAL FORMAT LOCK command, which requests that one oPCR is set into the locked state, is referred to as "output lock command", and an OUTPUT PLUG SIGNAL FORMAT LOCK command, which requests that one oPCR is set into the unlocked state, is referred to as "output unlock command". Similarly, an INPUT PLUG SIGNAL FORMAT LOCK command, which requests that one oPCR is set into the locked state, is referred to as "input lock command", and an INPUT PLUG SIGNAL FORMAT LOCK command, which requests that one oPCR is set into the unlocked state, is referred to as "input unlocked state".

Figure 4:
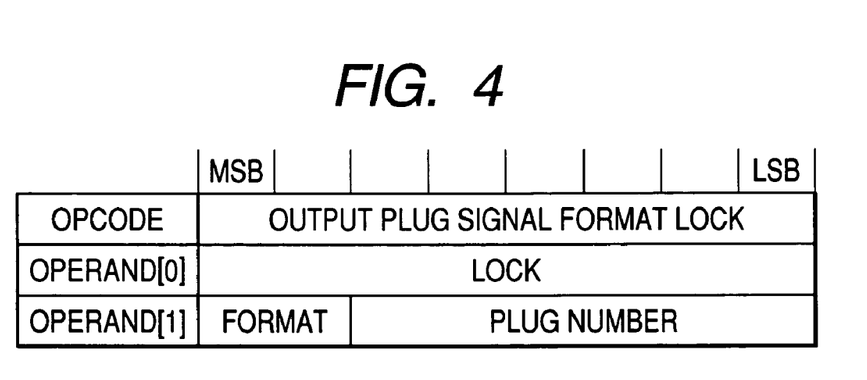
FIG. 4 is a view to explain a constitution of an OUTPUT PLUG SIGNAL FORMAT LOCK command.

FIG. 4 is a view to explain the constitution of the OUTPUT PLUG SIGNAL FORMAT LOCK command used in the present embodiment.

The OUTPUT PLUG SIGNAL FORMAT LOCK command is a command, which requests that the state of one or all of the oPCRs are set into the locked state or the unlocked state.

The OUTPUT PLUG SIGNAL FORMAT LOCK command is a command conformed to the AV/C command defined by "TA Document 2001012, AV/C Digital Interface Command Set General Specification 4.1, Dec. 11, 2001", and is a command, which is transmitted to a target (DVC 10) from a controller (PC 20 or DTV 50) by a FCP (Function Control Protocol) defined by the IEC 61883-1. The OUTPUT PLUG SIGNAL FORMAT LOCK command is a command defined in the present embodiment, and is not a command defined in the "TA Document 2001012, AV/C Digital Interface Command Set General Specification 4.1, Dec. 11, 2001".

In FIG. 4, an OPCODE field (8 bits) is a field, which stores a code indicating the OUTPUT PLUG SIGNAL FORMAT LOCK command.

The lock field (8 bits) of an OPERAND [0] field is a field, which stores a value showing that the OUTPUT PLUG SIGNAL FORMAT LOCK command is an output lock command or an output unlock command. In case 0×70 is stored in the OPERAND [0] field, the DVC 10 determines that the OUTPUT PLUG SIGNAL FORMAT LOCK command is an output lock command. Further, in case 0×60 is stored in the OPERAND [0] field, the DVC 10 determines that the OUTPUT PLUG SIGNAL FORMAT LOCK command is an output unlock command.

The FORMAT field (2 bits) of an OPERAND [1] field is an effective field when the OUTPUT PLUG SIGNAL FORMAT LOCK command is an output lock command, and is a field, which stores a value showing the data format designated by the output lock command. In case the value of 1 is stored in the FORMAT field, the DVC 10 determines that the DV system is a data format designated by the output lock command. Further, in case the value of 2 is stored in the FORMAT field, the DVC 10 determines that the MPEG-2 system is a data format designated by the output lock command. Further, in case the value of 0 is stored in the FORMAT field, the DVC 10 determines that the current format of the oPCR designated by the output lock command is a data format designated by the output lock command.

A PLUG NUMBER field (6 bites) of the OPERAND [1] field is a field, which stores a value showing a plug number of the oPCR to be set into the locked state or the unlocked state. In case the value of 1 is stored each bit of the PLUG NUMBER field, the DVC 10 determines that the oPCRs designated by the output lock command or the output unlock command is all the oPCRs. In case 0×00 is stored in the PLUG NUMBER field, the DVC 10 determines that the oPCR designated by the output lock command or the output unlock command is an oPCR of the number 0. Further, in case all 1 is stored in the PLUG NUMBER field, the DVC 10 determines that the oPCRs designated by the output lock command or the output unlock command is all the oPCRs.

The constitution of the OUTPUT PLUG SIGNAL FORMAT LOCK command is not limited to the constitution of FIG. 4. For example, in case there exists more than four types of data format which can be outputted from one oPCR, the constitution can be changed to a constitution in which an OPERAND [2] field is provided with a FORMAT field of 8 bits. Further, it can be constituted such that a code per se indicating the OUTPUT PLUG SIGNAL FORMAT LOCK designates a desired data format. In this case, a FORMAT field is not required.

Figure 5:
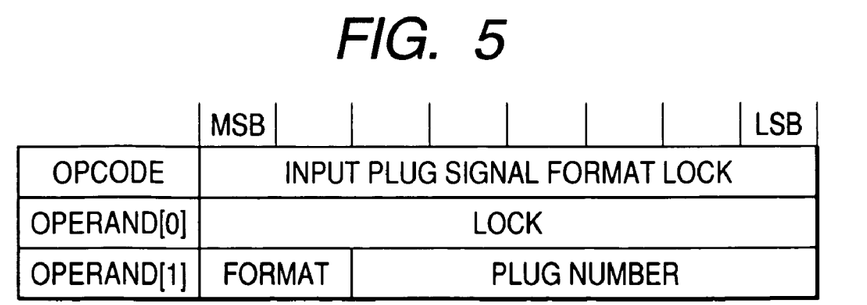
FIG. 5 is a view to explain a constitution of an INPUT PLUG SIGNAL FORMAT LOCK command.

FIG. 5 is a view to explain a constitution of the INPUT PLUG SIGNAL FORMAT LOCK command used in the present embodiment.

The INPUT PLUG SIGNAL FORMAT LOCK command is a command, which requests that the state of one or all of the iPCRs are set into the locked state or the unlocked state.

Further, the INPUT PLUG SIGNAL FORMAT LOCK command, similarly to the OUTPUT PLUG SIGNAL FORMAT LOCK command, is a command conformed to the AV/C command defined by the "TA Document 2001012, AV/C Digital Interface Command Set General Specification 4.1, Dec. 11, 2001", and is a command, which is transmitted to a target (DVC 10) from a controller (PC 20 or DTV 50) by the FCP (Function Control Protocol) defined by the IEC 61883-1. The INPUT PLUG SIGNAL FORMAT LOCK command is a command defined in the present embodiment, and is not a command defined in the "TA Document 2001012, AV/C Digital Interface Command Set General Specification 4.1, Dec. 11, 2001".

In FIG. 5, an OPCODE field (8 bits) is a field, which stores a code indicating the INPUT PLUG SIGNAL FORMAT LOCK command.

The LOCK field (8 bits) of an OPERAND [0] field is a field, which stores a value showing that the INPUT PLUG SIGNAL FORMAT LOCK command is an input lock command or an input unlock command. In case 0×70 is stored in the OPERAND [0] field, the DVC 10 determines that the INPUT PLUG SIGNAL FORMAT LOCK command is an input lock command. Further, in case 0×60 is stored in the OPERAND [0] field, the DVC 10 determines that the INPUT PLUG SIGNAL FORMAT LOCK command is an input unlock command.

The FORMAT field (2 bits) of an OPERAND [1] field is an effective field when the INPUT PLUG SIGNAL FORMAT LOCK command is an input lock command, and is a field, which stores a value showing the data format designated by the input lock command. In case the value of 1 is stored in the FORMAT field, the DVC 10 determines that the DV system is a data format designated by the input lock command. Further, in case the value of 2 is stored in the FORMAT field, the DVC 10 determines that the MPEG-2 system is a data format designated by the input lock command. Further, in case the value of 0 is stored in the FORMAT field, the DVC 10 determines that the current format of the iPCR designated by the input lock command is a data format designated by the input lock command.

A PLUG NUMBER field (6 bits) of the OPERAND [1] field is a field, which stores a value showing a plug number of the iPCR to be set into a locked state or an unlocked state. In case the value of all 1 is stored in the PLUG NUMBER field, the DVC 10 determines that the iPCRs designated by the input lock command or the input unlock command is all the iPCRs. In case 0×00 is stored in the PLUG NUMBER field, the DVC 10 determines that the iPCR designated by the input lock command or the input unlock command is an iPCR of the number 0. Further, in case the value of all 1 is stored in the PLUG NUMBER field, the DVC 10 determines that the iPCRs designated by the input lock command or the input unlock command is all the iPCRs.

The constitution of the INPUT PLUG SIGNAL FORMAT LOCK command is not limited to the constitution of FIG. 5. For example, in case there exist more than four types of data formats which can be inputted from one iPCR, the constitution can be changed to a constitution in which an OPERAND [2] field is provided with a FORMAT field of 8 bits. Further, it can be changed to a constitution in which a code per se indicating the INPUT PLUG SIGNAL FORMAT LOCK designates a desired data format. In this case, a FORMAT field is not required.

Figure 6:
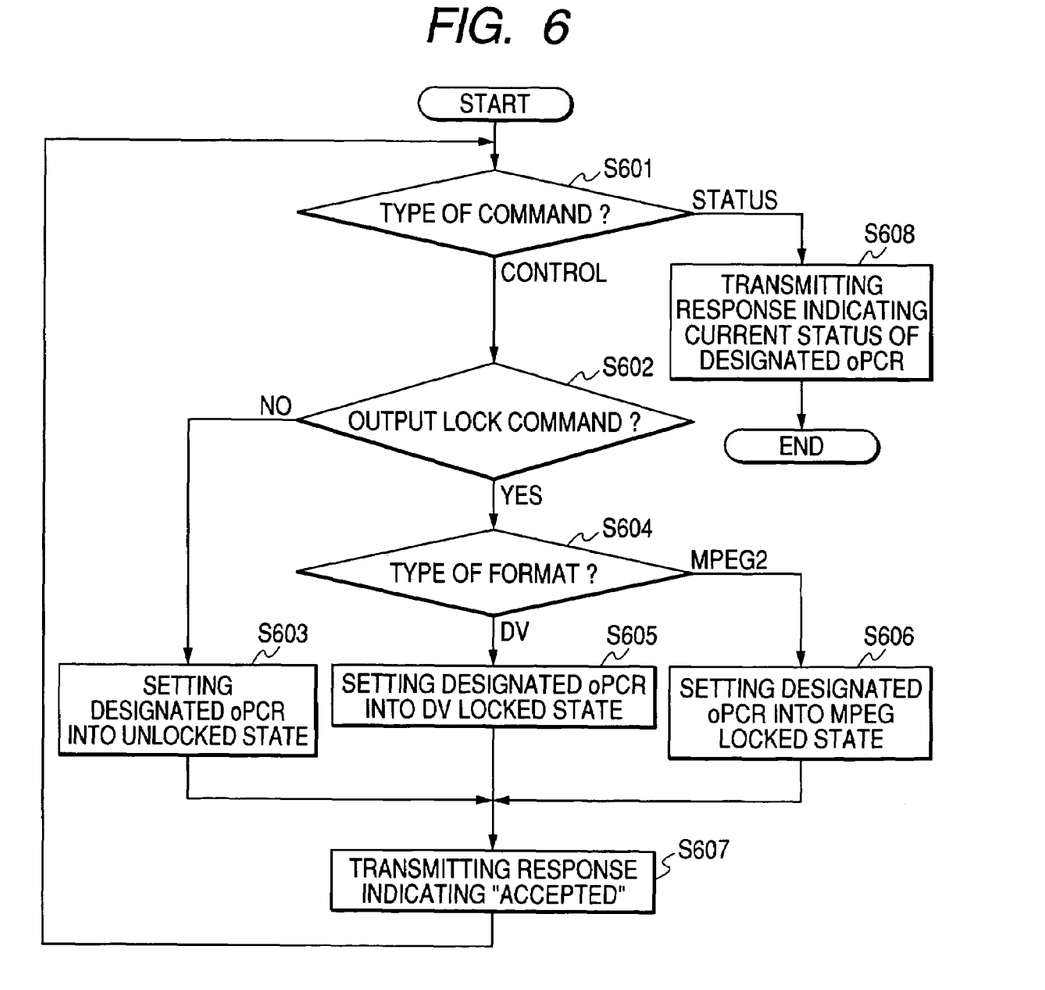
FIG. 6 is a flowchart to explain a process executed every time an OUTPUT PLUG SIGNAL FORMAT LOCK command is received by the recording and reproducing apparatus (for example, DVC)

Next, a process executed by the DVC 10 every time the OUTPUT PLUG SIGNAL FORMAT LOCK command is received will be described with reference to the flowchart of FIG. 6. The process described with reference to the flowchart of FIG. 6 is a process controlled by the control unit 105 according to a predetermined program.

In step S601, the control unit 105 determines the type (command type) of the OUTPUT PLUG SIGNAL FORMAT LOCK command transmitted from the PC 20 or the DTV 50 to the DVC 10. The classification of the OUTPUT PLUG SIGNAL FORMAT LOCK command can be determined by the C type defined by the "TA Document 2001012, AV/C Digital Interface Command Set General Specification 4.1, Dec. 11, 2001". In case the command type of the OUTPUT PLUG SIGNAL FORMAT LOCK command is a control (CONTROL), the process advances to step S602, and in case the command type of the OUTPUT PLUG SIGNAL FORMAT LOCK command is a status (STATUS), the process advances to step S608.

In step S602, whether or not the received OUTPUT PLUG SIGNAL FORMAT LOCK command is an output lock command is determined. In case the value of a ROCK within the OUTPUT PLUG SIGNAL FORMAT LOCK command is "0×0001", the command is determined to be an output lock command. In case the OUTPUT PLUG SIGNAL FORMAT LOCK command is an output lock command, the process advances to step S604, and in case the OUTPUT PLUG SIGNAL FORMAT LOCK command is an output unlock command, the process advances to step S603.

In step S603, the control unit 105 sets the oPCR into an unlocked state regardless of whether or not the oPCR designated by the received OUTPUT PLUG SIGNAL FORMAT LOCK command is in a locked state. That is, the control unit 105 sets the oPCR into an unlocked state even in case the oPCR designated by the OUTPUT PLUG SIGNAL FORMAT LOCK command is set into a locked state by a different control apparatus (for example, DTV 50) from the control apparatus (for example, PC 10) which transmits the command. According to such a constitution, there is no need to control by which control apparatus each oPCR is set into a locked state, and therefore, the constitution of the DVC 10 can be simplified, and the production cost of the DVC 10 can be reduced. The oPCR set into an unlocked state can output the stream data of various data formats. That is, the oPCR set into an unlocked state can also output the DV data as well as the MPEG-2 data.

In step S604, the control unit 105 determines the type (format type) of the data format designated by the received OUTPUT PLUG SIGNAL FORMAT LOCK command. Here, in case the value of 0 is stored in the FORMAT field, the control unit 105 determines that the current format of the oPCR designated by the output lock command is the data format designated by the output lock command. In case the designated data format is the DV system, the process advances to step S605, and in case the designated data format is the MPEG format, the process advances to step S606.

In step S605, the control unit 105 sets the oPCR into a DV locked state regardless of whether or not the oPCR designated by the received OUTPUT PLUG SIGNAL FORMAT LOCK command is in an unlocked state. That is, the control unit 105 sets the oPCR into a DV locked state even in case the oPCR designated by the OUTPUT PLUG SIGNAL FORMAT LOCK command is set into an unlocked state by a different control apparatus (for example, DTV 50) different from the control apparatus (for example, PC 10) which transmits the command. According to such a constitution, there is no need to control by which control apparatus each oPCR is set into an unlocked state, and therefore, the constitution of the DVC 10 can be simplified, and the production cost of the DVC 10 can be reduced. The oPCR set into a DV locked state can only output the DV data.

In case the stream data outputted from the oPCR set into a DV locked state is a stream data (for example, MPEG data) other than the DV data, the IEEE 1394 interface unit 104 outputs an isochronous packet including only a CIP header, which indicates that it is the DV system, to the IEEE 1394 serial bus 30. As for the constitution of the CIP header, since it is described in detail in the IEC 61883-1, IEC 61883-2, IEC 61883-3, IEC 61883-4, and IEC 61883-5, the description thereof will be omitted.

In step S606, the control unit 105 sets the oPCR into a MPEG locked state regardless of whether or not the oPCR designated by the received OUTPUT PLUG SIGNAL FORMAT LOCK command is in an unlocked state. That is, the control unit 105 sets the oPCR into a MPEG locked state even in case the oPCR designated by the OUTPUT PLUG SIGNAL FORMAT LOCK command is set into an unlocked state by a control apparatus (for example, DTV 50) different from the control apparatus (for example, PC 10) which transmits the command. According to such a constitution, there is no need to control by which control apparatus each oPCR is set into an unlocked state, and therefore, the constitution of the DVC 10 can be simplified, and the production cost of the DVC 10 can be reduced. The oPCR set into a MPEG locked state can only output the MPEG-2 data.

In case the stream data outputted from the oPCR set into a MPEG locked state are stream data (for example, MPEG data) other than the MPEG-2 data, the IEEE 1394 interface unit 104 outputs an isochronous packet including only a CIP header, which indicates that it is the MPEG-2 system, to the IEEE 1394 serial bus 30.

In step S607, the control unit 105 transmits a response indicating "ACCEPTED" to the PC 20 or the DTV 50. The response indicating "ACCEPTED" is a response indicating that it has normally accepted the OUTPUT PLUG SIGNAL FORMAT LOCK command.

In this way, according to the present embodiment, even after one oPCR is set into a DV locked state in accordance with the command transmitted from the PC 10 (or DTV 50), the state of the oPCR can be changed into an unlocked state or an MPEG locked state in accordance with the command transmitted from the DTV 50 (or PC 10). That is, the OUTPUT PLUG SIGNAL FORMAT LOCK command received later can be given priority.

Further, according to the present embodiment, even after the state of one oPCR is set into an MPEG locked state in accordance with the command from the PC 10 (or DTV 50), the state of the oPCR can be changed into an unlocked state or a DV locked state according to the command transmitted from the DTV 50 (or PC 10).

Further, according to the present embodiment, even after the state of one oPCR is set into an unlocked state in accordance with the command from the PC 10 (or DTV 50), the state of the oPCR can be changed into a DV locked state or an MPEG locked state in accordance with the command transmitted from the DTV 50 (or PC 10).

The process described in FIG. 6 can be performed for every oPCR. Consequently, the DVC 10 can set all the oPCRs (the maximum 31 pieces) carried by itself into an unlocked state, a DV locked state or an MPEG locked state.

Figure 7:
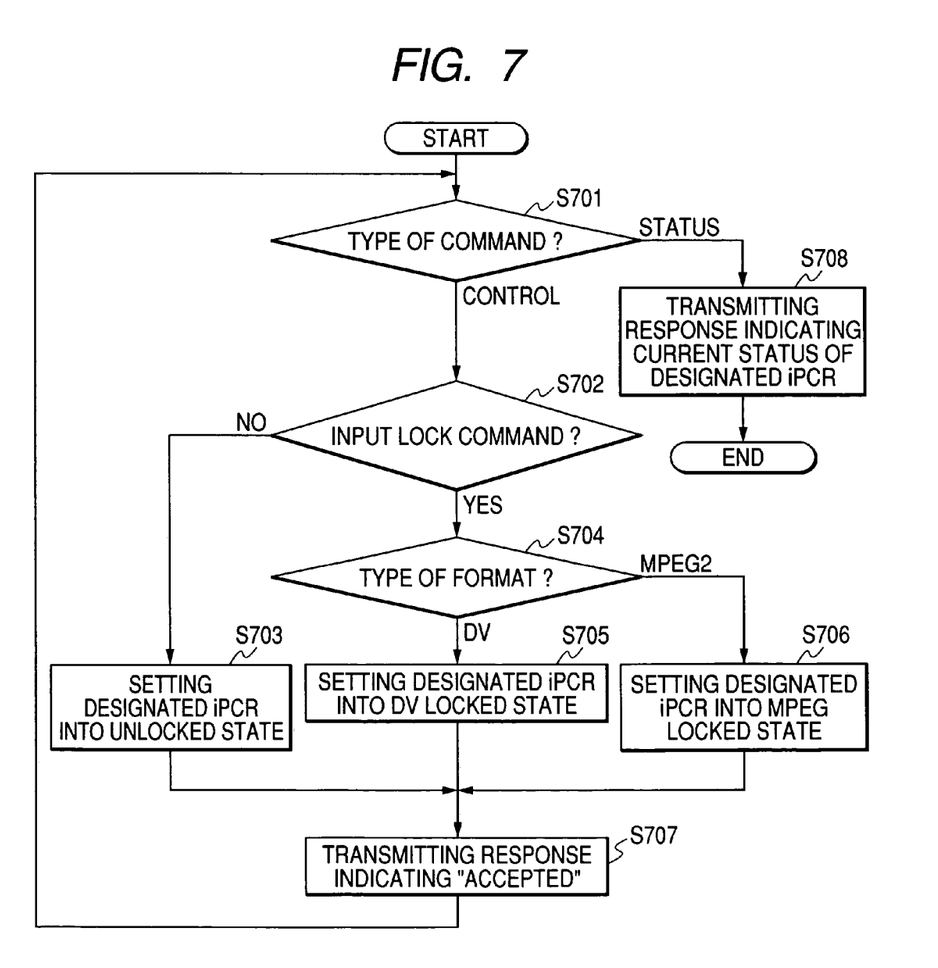
FIG. 7 is a flowchart to explain a process executed every time an INPUT PLUG SIGNAL FORMAT LOCK command is received by the recording and reproducing apparatus (for example, DVC).

Next, the process executed by the DVC 10 every time the INPUT PLUG SIGNAL FORMAT LOCK command is received-will be described with reference to the flowchart of FIG. 7. The process described with reference to FIG. 7 is a process controlled by the control unit 105 according to a predetermined program.

In step S701, the control unit 105 determines the type (command type) of the INPUT PLUG SIGNAL FORMAT LOCK command transmitted from the PC 20 or the DTV 50 to the DVC 10. The classification of the INPUT PLUG SIGNAL FORMAT LOCK command can be determined by the C type defined by the "TA Document 2001012, AV/C Digital Interface Command Set General Specification 4.1, Dec. 11, 2001". In case the command type of the INPUT PLUG SIGNAL FORMAT LOCK command is a control (CONTROL), the process advances to step S702, and in case the command type of the INPUT PLUG SIGNAL FORMA LOCK command is a status (STATUS), the process advances to step S708.

In step S702, whether or not the received INPUT PLUG SIGNAL FORMAT LOCK command is an output lock command is determined. In case the value of a ROCK within the INPUT PLUG SIGNAL FORMAT LOCK command is 0×0001, the command is determined to be an input lock command. In case the INPUT PLUG SIGNAL FORMAT LOCK command is an input lock command, the process advances to step S704, and in case the INPUT PLUG SIGNAL FORMAT LOCK command is an input unlock command, the process advances to step S703.

In step S703, the control unit 105 sets the iPCR into an unlocked state regardless of whether or not the iPCR designated by the received INPUT PLUG SIGNAL FORMAT LOCK command is in a locked state. That is, the control unit 105 sets the iPCR into an unlocked state even in case the iPCR designated by the INPUT PLUG SIGNAL FORMAT LOCK command is set into a locked state by a control apparatus (for example, DTV 50) different from the control apparatus (for example, PC 10) which transmits the command. According to such a constitution, there is no need to control by which control apparatus each iPCR is set into a locked state, and therefore, the constitution of the DVC 10 can be simplified, and the production cost of the DVC 10 can be reduced. The iPCR set into an unlocked state can output the stream data of various data formats. That is, the iPCR set into an unlocked state can also output the DV data as well as the MPEG-2 data.

In step S704, the control unit 105 determines the type (format type) of the data format designated by the received INPUT PLUG SIGNAL FORMAT LOCK command. Here, in case the value of 0 is stored in the FORMAT field, the control unit 105 determines that the current format of the iPCR designated by the input lock command is the data format designated by the input lock command. In case the designated data format is the DV system, the process advances to step S705, and in case the designated data format is the MPEG format, the process advances to step S706.

In step S705, the control unit 105 sets the iPCR into a DV locked state regardless of whether or not the iPCR designated by the received INPUT PLUG SIGNAL FORMAT LOCK command is in an unlocked state. That is, the control unit 105 sets the iPCR into a DV locked state even in case the iPCR designated by the INPUT PLUG SIGNAL FORMAT LOCK command is set into an unlocked state by a control apparatus (for example, DTV 50) different from the control apparatus (for example, PC 10) which transmits the command. According to such a constitution, there is no need to control by which control apparatus each iPCR is set into an unlocked state, and therefore, the constitution of the DVC 10 can be simplified, and the production cost of the DVC 10 can be reduced. The oPCR set into a DV locked state can only output the DV data.

In case the stream data outputted from the oPCR set into a DV locked state is a stream data (for example, MPEG data) other than the DV data, the IEEE 1394 interface unit 104 outputs an isochronous packet including only a CIP header, which indicates that it is the DV system, to the IEEE 1394 serial bus 30. As for the constitution of the CIP header, since it is described in detail in the IEC 61883-1, IEC 61883-2, IEC 61883-3, IEC 61883-4, and IEC 61883-5, the description thereof will be omitted.

In step S706, the control unit 105 sets the iPCR into a MPEG locked state regardless of whether or not the iPCR designated by the received INPUT PLUG SIGNAL FORMAT LOCK command is in an unlocked state. That is, the control unit 105 sets the iPCR into an MPEG locked state even in case the iPCR designated by the INPUT PLUG SIGNAL FORMAT LOCK command is set into an unlocked state by a control apparatus (for example, DTV 50) different from the control apparatus (for example, PC 10) which transmits the command. According to such a constitution, there is no need to control by which control apparatus each iPCR is set into an unlocked state, and therefore, the constitution of the DVC 10 can be simplified, and the production cost of the DVC 10 can be reduced. The iPCR set into an MPEG locked state can only output the MPEG-2 data.

In case the stream data outputted from the iPCR set into an MPEG locked state is a stream data (for example, MPEG data) other than the MPEG-2 data, the IEEE 1394 interface unit 104 outputs an isochronous packet including only a CIP header, which indicates that it is the MPEG-2 system, to the IEEE 1394 serial bus 30.

In step S707, the control unit 105 transmits a response indicating "ACCEPTED" to the PC 20 or the DTV 50. The response indicating "ACCEPTED" is a response indicating that it has normally accepted the INPUT PLUG SIGNAL FORMAT LOCK command.

In this way, according to the present embodiment, even after one iPCR is set into a DV locked state in accordance with the command transmitted from the PC 10 (or DTV 50), the state of the iPCR can be changed into an unlocked state or an MPEG locked state in accordance with the command transmitted from the DTV 50 (or PC 10). That is, the INPUT PLUG SIGNAL FORMAT LOCK command received later can be given priority.

Further, according to the present embodiment, even after the state of one iPCR is set into an MPEG locked state in accordance with the command from the PC 10 (or DTV 50), the state of the iPCR can be changed into an unlocked state or a DV locked state in accordance with the command transmitted from the DTV 50 (or PC 10).

Further, according to the present embodiment, even after the state of one iPCR is set into an unlocked state in accordance with the command from the PC 10 (or DTV 50), the state of the iPCR can be changed into a DV locked state or an MPEG locked state according to the command transmitted from the DTV 50 (or PC 10).

The process described with reference to FIG. 7 can be performed for every iPCR. Consequently, the DVC 10 can set all the iPCRs (the maximum 31 pieces) carried by itself into an unlocked state, a DV locked state or an MPEG locked state.

Second Embodiment

Needless to mention, an object of the present invention can be achieved also by providing a recording medium storing a computer program of realizing the function of the above described embodiment to a system or an apparatus, and by reading and executing the computer program stored in the recording medium by a computer (or CPU and MPU) of the system or the apparatus.

In this case, the computer program itself read from the recording medium realizes the function of the above described embodiment, and the computer program itself and the recording medium storing the computer program constitutes the present invention.

As for the recording medium of providing the computer program, for example, a flexible disk, a hard disk, an optical disk, a magnetic optical disk, CD-ROM, CD-R, a magnetic tape, a nonvolatile memory card, ROM, and the like can be used.

Further, needless to mention, there is a case where, by executing the program read by the computer, not only the above described functions of the embodiment are realized, but there is also the case where, based on the designation of the computer program, a part or all the actual processes are performed by the OS (basic system or operating system) and the like operated on the computer, and by those processes, the above described functions of the embodiment are realized. This case may constitute the present invention.

Further, needless to mention, there is also the case where the computer program read from the recording medium is written in a memory provided for a feature extension unit connected to a feature extension board inserted into a computer and a computer, and after that, based on the designation of that computer program, the CPU and the like provided for the feature extension board or the feature extension unit performs a part or all the actual processes, and by those processes, the above described functions of the embodiment are realized. This case may also constitute the present case.

The present invention is not limited to the above described embodiments, but can be applied also to various embodiments.

For example, though the above described embodiments are embodiments adopting a transmission medium conformed to the IEEE 1394 standards, the present invention can be applied also to an embodiment adopting the transmission medium conformed to a USB regulation and the like.

Further, while the above embodiments are embodiments adopting the oPCR or the iPCR defined by the IEC 61883-1, the present invention can be also applied to an embodiment adopting the output means equivalent to the oPCR including not only the logical output terminal such as the oPCR, but also the physical output terminal, and the input means equivalent to the iPCR including not only the logical input terminal such as the iPCR, but also the physical input terminal.

Further, while the above described embodiments are embodiments adopting the DV system and the MPEG-2 system, the present invention can be also applied to an embodiment adopting a data format other than the DV system or an embodiment adopting a data format other than the MPEG-2 system.

Further, while the above described embodiments have described the embodiments adopting two data formats, the present invention can be applied also to an embodiment adopting three or more data formats.

The above-described preferable embodiments are merely exemplary of the present invention, and are not to be construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

This application claims priority from Japanese Patent Application No. 2004-047053 filed on Feb. 23, 2004, which is hereby incorporated by reference herein.

What is claimed is:

1. A data output apparatus comprising:
   an output terminal, wherein the output terminal is an oPCR (output plug control register) defined by the IEC by the 61883-1 standard;
   a receiving unit that is configured to receive a first command from a first control device, and to receive a second command from a second control device different from the first control device; and
   a control unit that (a) sets the output terminal to a first state where a data format of the output terminal is locked to a data format indicated by the first command and where the output terminal cannot output video data whose data format is different from the data format indicated by the first command, if the receiving unit receives the first command from the first control device; and (b) sets the output terminal to a second state where the data format of the output terminal is not locked to the data format indicated by the first command and where the output terminal can output video data whose data format is different from the data format indicated by the first command, if the receiving unit receives the second command from the second control device while the data format of the output terminal is locked to the data format indicated by the first command.

2. The data output apparatus according to claim 1, wherein the output terminal is a logical output terminal.

3. A method of controlling a data output apparatus having an output terminal, the method comprising:
   a first receiving step of receiving a first command from a first control device;
   a second receiving step of receiving a second command from a second control device different from the first control device;
   a first setting step of setting the output terminal to a first state where a data format of the output terminal is locked to a data format indicated by the first command and where the output terminal cannot output video data whose data format is different from the data format indicated by the first command, if the first command is received from the first control device; and
   a second setting step of setting the output terminal to a second state where the data format of the output terminal is not locked to the data format indicated by the first command and where the output terminal can output video data whose data format is different from the data format indicated by the first command, if the second command is received from the second control device while the data format of the output terminal is locked to the data format indicated by the first command, wherein the output terminal is an oPCR (output plug control register) defined by the IEC 61883-1 standard.

4. The method according to claim 3, wherein the output terminal is a logical output terminal.

* * * * *